United States Patent
Usui

(10) Patent No.: US 6,531,199 B2
(45) Date of Patent: *Mar. 11, 2003

(54) MULTIPLE COAT METAL PIPE AND ITS FABRICATION METHOD

(75) Inventor: Masayoshi Usui, Numazu (JP)

(73) Assignee: Usui Kokusai Sangyo Kaisha Ltd., Shizuoka (JP)

( * ) Notice: Subject to any disclaimer, the term of this patent is extended or adjusted under 35 U.S.C. 154(b) by 15 days.

This patent is subject to a terminal disclaimer.

(21) Appl. No.: 09/860,472

(22) Filed: May 21, 2001

(65) Prior Publication Data

US 2001/0028933 A1 Oct. 11, 2001

Related U.S. Application Data

(62) Division of application No. 09/080,404, filed on May 18, 1998, now Pat. No. 6,358,581.

(30) Foreign Application Priority Data

May 20, 1997 (JP) ............................................. 9-145869

(51) Int. Cl.$^7$ ............................. B29D 23/00; F16L 9/14
(52) U.S. Cl. ................... 428/35.9; 428/36.91; 138/141; 138/143; 156/244.13; 156/244.23; 72/370.1; 72/370.06; 72/370.16; 72/370.21
(58) Field of Search .............................. 428/35.8, 35.9, 428/36.91, 458, 461; 138/141, 143; 156/244.13, 244.23; 427/407.1, 410, 421, 435; 72/370.1, 370.06, 370.16, 370.21

(56) References Cited

U.S. PATENT DOCUMENTS

| 5,023,115 | A | 6/1991 | Mizuhashi |
| 5,520,223 | A | 5/1996 | Iorio et al. |
| 6,358,581 | B1 * | 3/2002 | Usui ........................ 138/141 |

FOREIGN PATENT DOCUMENTS

JP          8-197635         8/1996

* cited by examiner

*Primary Examiner*—Rena L. Dye
(74) *Attorney, Agent, or Firm*—Rader, Fishman & Grauer PLLC

(57) ABSTRACT

To provide a multiple coat metal pipe and its fabrication method having excellent corrosion resistance without deteriorating chipping resistance or splashing resistance, capable of being fabricated easily and capable of simply carrying out peel off operation owing to a weak peel off strength wherein corrosion resistance of an end working portion is not deteriorated, there is provided a multiple coat metal pipe which is a metal pipe constituted by multiplexing and coating a first layer including a resin having an adhesive force in respect of a surface treatment layer formed on an outer peripheral face of the metal pipe and capable of being extruded and a second layer provided on an outer peripheral face of the first layer, having a chipping resistance and capable of being extruded, wherein a peel off strength between the first layer and the second layer is 75 g/cm or less.

3 Claims, 2 Drawing Sheets

PEELED-OFF PORTION

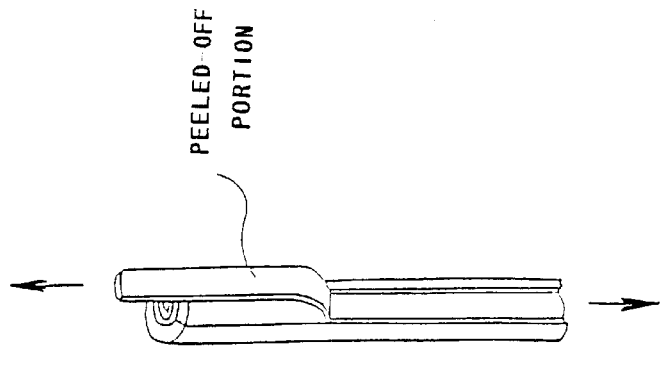
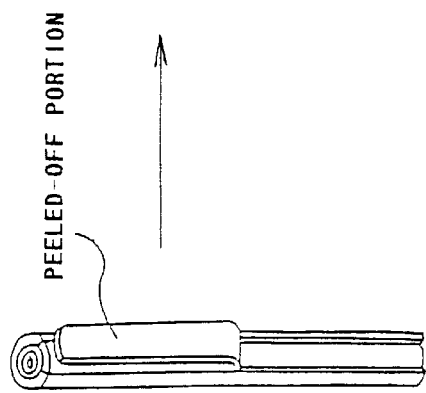
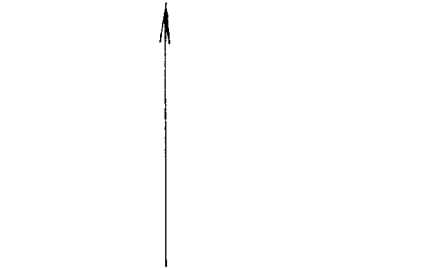
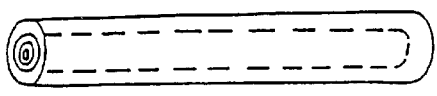

MULTIPLE COAT METAL PIPE AND ITS FABRICATION METHOD

This is a Division of application Ser. No. 09/080,404 filed May 18, 1998 now U.S. Pat. No. 6,358,581. The disclosure of the prior application(s) is hereby incorporated by reference herein in its entirety.

BACKGROUND OF THE INVENTION

1. Field of the Invention

The present invention relates to a multiple coat metal pipe and its fabrication method in which in a metal pipe comprising a comparatively slender diameter of a pipe diameter of 20 mm or smaller which is arranged particularly at a lower portion of a chassis as a pipe of a brake pipe, a fuel pipe or the like in an automobile or the like, multiple coat layers are provided on its outer peripheral face for achieving durability against chipping (flying stone) or splashing (muddy water) in running and end working of flaring, spooling and buldging or the like is carried at a pipe end portion thereof in later steps.

2. Description of the Prior Arts

In recent years, there have been proposed a number of resin coat metal pipes for pipes of brake pipes, fuel pipes and the like arranged at a lower portion of an automobile in which coating layers are formed in a thick film shape to provide chipping resistance or splashing resistance.

As such a coated metal pipe, there have been known a metal pipe formed with a chromate coating as necessary on a Zn (zinc) or Zn/Ni (nickel) plated film that is coated on an outer peripheral face thereof, further coated with polyvinyl fluoride (PVF) having a thickness of about 20 $\mu$m and coated with a thermally contractive tube further thereon thereby forming multiple coat layers and a metal pipe formed with polyamide-based resin (PA) such as PA 11 or PA 12 having a thickness of about 200 through 300 $\mu$m by extrusion on a Zn or Zn/Al (aluminum) film that is coated on an outer peripheral face thereof.

However, according to the former conventional technology, there poses a problem in which a product cost is increased since the expensive thermally contractive tube is used and time and labor are needed in fabrication since the technology includes a step of heating for contracting the tube after the thermally contractive tube is covered on the polyvinyl fluoride layer which deteriorates the productively and according to the latter conventional technology, there poses a problem in which the corrosion resistance is deteriorated when the pipe undergoes attack of chipping or the like since a single layer of polyamide-based resin in a thick film shape is used.

Hence, as a result of studying in various ways in respect of a coated metal pipe having excellent corrosion resistance without deteriorating chipping resistance or splashing resistance and facilitating the fabrication, the inventors have paid attention to a metal pipe having multiple coat layers in which on an outer peripheral face of the metal pipe previously subjected to a surface treatment, a resin layer comprising a polyamide-based resin (PA), polypropylene (PP), polyethylene (PE), polyvinylidene fluoride (PVdF) or the like having adhesion force in respect of the surface treatment layer, is formed as an inner layer, on which PP, PE or polyamide-based resin similar to the above-described having chipping resistance or splashing resistance, is coated over an entire length. Further, in respect of a multiple coat metal pipe constituted as described above, a soft chipping test using stones having a size of 2.5 through 5 mm with an amount of flying stones of 500 g×1 time under air pressure of 1 kgf/cm$^2$ and a hard chipping test using stones having a size of 5 through 9 mm with an amount of flying stones of 500 g×5 times under air pressure of 5 kgf/cm$^2$, have been carried out and a result in respect of the chipping resistance has been obtained as expected by the inventors.

According to the multiple coat metal pipe constituted as described above, a satisfactory result has been obtained in respect of the corrosion resistance without deteriorating the chipping resistance or the splashing resistance as mentioned above, the following problem is posed when the pipe is actually arranged at the lower portion of an automobile or the like. That is, normally, end working of flaring, spooling, buldging or the like is carried out to mutually connect multiple coat metal pipes and in that case, an outermost layer of the multiple coat layers of the metal pipe is peeled off and thereafter, the end working is carried out. However, in the case of the above-described multiple coat metal pipe, in peeling off the outermost layer, there have been cases in which the inner layer adheres to the outermost layer and is peeled off along therewith or although the inner layer does not adhere to the outermost layer, the inner layer is partially peeled off from the coated film.

When the inner layer is also peeled off in this way, the corrosion resistance of the end working portion is deteriorated and therefore, in carrying out the peeling off operation, in order to prevent occurrence of the situation where the inner layer is peeled off, close attention must be paid and therefore, time and labor is needed in the operation, the operational performance is significantly deteriorated and the productivity cannot be improved.

SUMMARY OF THE INVENTION

The present invention has resolved such a problem and it is an object of the present invention to provide a multiple coat metal pipe and its fabrication method having excellent corrosion resistance without deteriorating chipping resistance or splashing resistance, capable of being fabricated easily and capable of simply carrying out peel off operation owing to a weak peel off strength wherein corrosion resistance of an end working portion is not deteriorated.

In order to achieve the above-described object, the inventors have carried out various researches and completed the present invention to find out that in extruding two layers of resin layers on an outer peripheral face of a metal pipe on the outer peripheral face of which a surface treatment has been carried out by an electric or molten plating process or the like, by bringing the both layers substantially into a non-adhesive state such that a peel off strength between the both layers is 75 g/cm or less, excellent corrosion resistance is achieved without deteriorating chipping resistance or splashing resistance, the peel off operation can easily be carried out and corrosion resistance at an end working portion is not deteriorated.

Therefore, according to a first aspect of the present invention, there is provided a multiple coat metal pipe which is a metal pipe constituted by multiplexing and coating a first layer comprising a resin having an adhesive force in respect of a surface treatment layer formed on an outer peripheral face of the metal pipe and capable of being extruded and a second layer provided on an outer peripheral face of the first layer, having a chipping resistance and capable of being extruded, wherein a peel off strength between the first layer and the second layer is 75 g/cm or less.

Further, according to a second aspect of the present invention, there is provided a method of fabricating a multiple coat metal pipe, wherein a first layer comprising a resin having an adhesive force is extruded on a surface treatment layer provided on an outer peripheral face of a metal pipe and a second layer comprising a resin having a chipping resistance is extruded on an outer peripheral face of the first layer and the both resin layers are brought into contact with each other and are multiplexed with each other substantially in a non-adhesive state. In this case, it is preferable that when the resins of the first layer and the second layer are provided with mutual dissolving performance, the second layer is extruded at a temperature equal to or lower than the melting point of the first layer and when the resins of the first layer and the second layer are not provided with the mutual dissolving performance, the second layer is extruded at a temperature equal to or higher than the melting point of the first layer.

BRIEF DESCRIPTION OF THE DRAWINGS

FIGS. 1(a), 1(b), 1(c) and 1(d) are perspective views showing an outline of a peel off test used in the present invention in which FIGS. 1(a), 1(b), 1(c) and 1(d) are views showing its procedure.

DETAILED DESCRIPTION OF THE INVENTION

Figure 2:
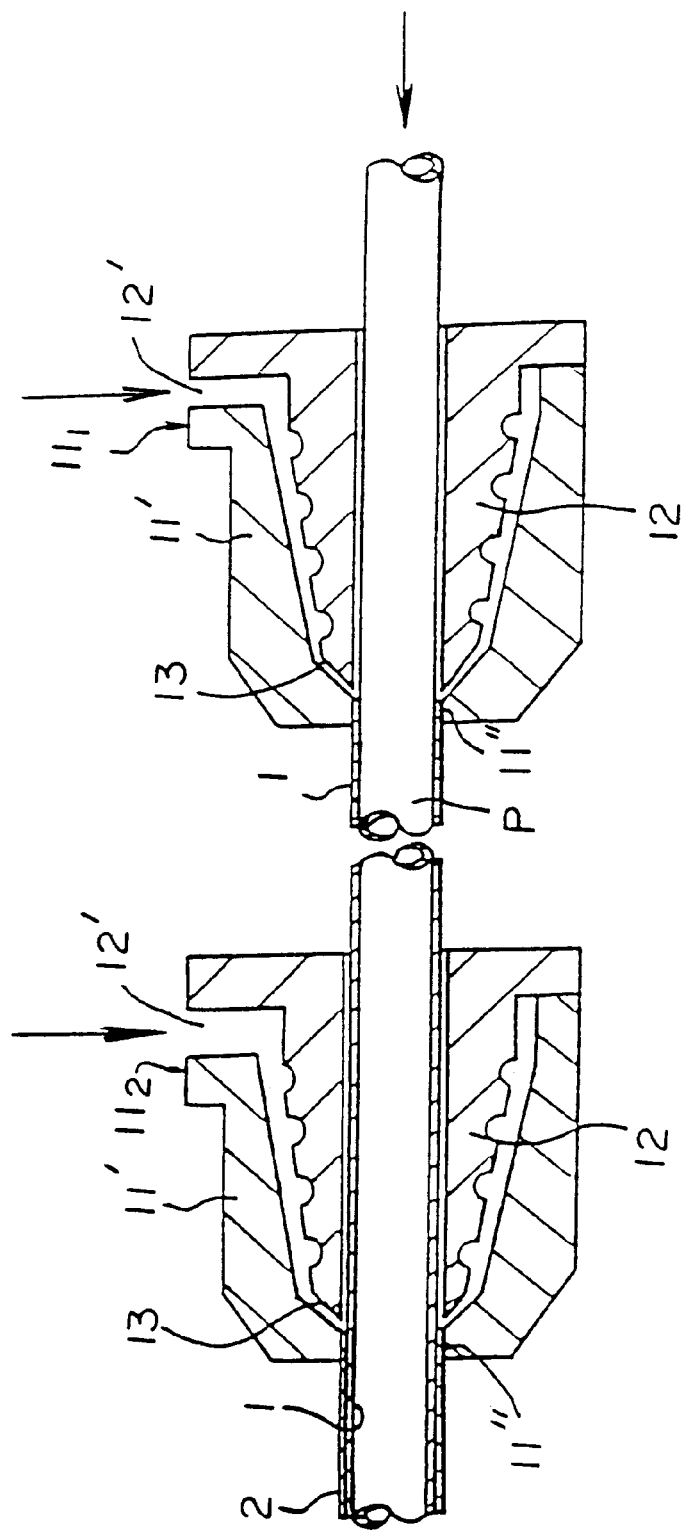
FIG. 2 is a sectional view showing an embodiment of an extrusion coating device used in fabricating a multiple coat metal pipe according to the present invention.

First, a metal pipe used in the present invention is a seamless pipe, a semi-seamless pipe, an electrically welded pipe or a metal pipe comprising a soldered pipe or a welded pipe having previously a coated film of a copper alloy and fabricated by being wound in a single layer or multiple layers, which is provided with an outer diameter of about 20 mm or smaller. Further, its outer peripheral face is subjected to a surface treatment of a plated film of Zn, Al or alloys based thereon through the electric plating process or the molten plating process and coated with a film of chromate such as yellow chromate, olive chromate or the like on the surface of the plated film or the like as necessary.

Further, the surface treatment layer may be coated with a single layer of epoxy-based resin, polyamide-based resin, silane coupling agent, titanium coupling agent or the like as a primer by means of extrusion forming, spraying, showering, dipping, brush coating, powder coating, hot melting or the like.

Next, a first layer comprising polyamide-based resin (PA) of PA 6, PA 11, PA 12 or the like is formed on the surface treatment layer or the primer layer by a film thickness of 20 through 50 $\mu$m through extrusion forming. When the film thickness of the first layer is less than 20 $\mu$m, the corrosion resistance is deficient and meanwhile, when it exceeds 50 $\mu$m, a fastening nut which has conventionally been used and prescribed cannot be used.

Further, a resin having chipping resistance, for example, polypropylene (PP), polyethylene (PE) or polyamide-based resin (PA) mentioned above is coated on and multiplexed with the first layer over an entire length by a film thickness of 100 $\mu$m through 1.5 mm through the extrusion forming by which a second layer is formed. In this case, when the first layer resin and the second layer resin are provided with mutual dissolving performance, it is important that temperature of molten resin flowing out from a die main body of an extrusion coating device such that both layers of the outer surface of the first layer and the inner surface of the second layer are brought into contact with each other, is measured by a sensor such as a thermistor or a thermocouple or a radiation pyrometer and the second layer is extruded at a temperature which is equal to or lower than the melting point of the first layer thereby multiplexing and coating the both layers. Meanwhile, when the first layer resin and the second layer resin are not provided with the mutual dissolving performance, the second layer may be extruded on the first layer at a temperature which is equal to or higher than the melting point of the first layer resin.

Incidentally, the melting points of resins exemplified above are well known, for example, that of PA 6 is 210 through 220° C., that of PA 11 is 191 through 194° C., that of PA 12 is 160 through 209° C., that of polypropylene is 168 through 175° C. and that of polyethylene is 130 through 137° C.

Further, even when a defect, for example, a pin hole or the like is caused at the first layer, the defect is covered by the second layer by which the defect can be prevented from being made continuous from the inner face to the outer face and as a result, the corrosion resistance can be promoted.

Further, the reason for limiting the layer thickness of the second layer to the above-described range is that when it is less than 100 $\mu$m, sufficient chipping resistance cannot be provided and in the meantime, even when it is the layer thickness exceeding 1.5 mm, not only no differentiation is produced in promoting the chipping resistance, the splashing resistance and the corrosion resistance but also when bending is carried out, crack or the like may be caused in the multiple coat layer.

In respect of the multiple coat metal pipe provided in this way, the second layer is peeled off while having the first layer remain in order to carry out end working of flaring, spooling, buldging or the like, when the peel off strength between the first layer and the second layer exceeds 75 g/cm, there have been cases where the first layer adheres to the second layer to be peeled off and is peeled off along therewith or the first layer is partially peeled off from the plated film by which the corrosion resistance of the end working portion is deteriorated. Accordingly, in order to maintain a substantially non-adhesive state between the first layer and the second layer, the peel off strength between the first layer and the second layer needs to be 75 g/cm or lower. A method of measuring the peel off strength used in this case will be explained in reference to FIGS. 1(a), 1(b), 1(c) and 1(d).

Among the multiple coat layers coated on the outer peripheral face of a metal tube cut in a predetermined length as shown by FIG. 1(a), a pair of cuts in the longitudinal direction having a predetermined width are produced only at the external layer (refer to FIG. 1(b)), the portion of the external layer is peeled off and thereafter the peeled-off portion is folded back upwardly as shown by FIG. 1(c) and as shown by FIG. 1(d), the peel off test is carried out by pulling an end portion of the peeled-off portion relative to a lower end portion of the multiple coat layers in an allow mark direction at a pulling speed of 20 mm/minutes and a result of the test is measured in respect of the peel off strength on whether the inner layer is adhered to the outer layer.

Further, although a conventional extrusion coating device can be used in the multiple coat metal pipe and a device for carrying out the fabrication method according to the present invention, a device as shown by FIG. 2 is preferable in order to control temperatures of resins forming the multiple coat layers. That is, in FIG. 2, notation ($11_1$) designates an extrusion die in an extrusion coating device provided to extrude the first layer (1), a feeding gap (13) communicating with a resin supply port (12') is held between opposed inner peripheral faces by a die main body (11') and a guide core (12), a nozzle port (11") is constituted by a front end portion on the side of the die main body (11'), at inside of the guide core (12) a metal pipe (P) is moved forwardly by a feed device using rolls (not illustrated), a constant amount of resin is supplied from the nozzle port (11") and the first layer (1) is extruded on the outer peripheral face of the metal pipe.

Next, an extrusion die ($11_2$) having a constitution similar to that of the extrusion die ($11_1$) is installed at an interval in the axial direction of the extrusion die ($11_1$) and the metal pipe (P), a constant amount of resin is supplied from the nozzle port (11") and the second layer (2) is extruded on the outer peripheral face of the first layer (1) to multiplex therewith and coat thereon.

Further, according to the present invention, a sensor such as a thermistor or a thermocouple or a radiation pyrometer is installed at each of a vicinity of the nozzle port (11") of the extrusion die ($11_1$) and a vicinity of the nozzle port (11") of the extrusion die ($11_2$) by which temperatures of molten resins flowing out from the nozzle ports (11") are measured, the forming operation is performed such that a temperature of extruding the resin forming the second layer (2) is preferably equal to or lower than the melting point of the resin forming the first layer (1) and temperatures of the extrusion dies, the amounts of supplying the resins and the speed of moving the metal pipe and so on are controlled such that both layers are brought into contact with each other and multiplexed.

Further, when the temperatures of the molten resins flowing out from the nozzle ports (11") can pertinently be controlled, a single extrusion coating device simultaneously extruding multiple layers of the first layer (1) and the second layer (2) can also be used.

After peeling off the second layer (2) at a pipe end portion of the metal pipe (P) formed with the multiple coat layer at its outer peripheral face in this way, a fastening nut for connection is inserted at the peeled-off portion, thereafter, end working is carried out and predetermined bending is successively carried out.

EXAMPLES

Next, an explanation will be given of Examples according to the present invention along with Comparative Examples.

Example 1

A double-wound steel pipe formed into an outer diameter of 8 mm, a wall thickness of 0.7 mm and a length of 30 m is prepared by using a hoop member having the material of SPCC on both faces of which copper plated layers having a film thickness of 3 $\mu$m are constituted. A coated film of Zn having an average film thickness of 25 $\mu$m is formed on the outer peripheral face of the double-wound steel pipe by using an acidic electrolyte having a major component of zinc sulfate and added with an organic adding agent by conducting electricity for 2 minutes at temperatures of 55 through 60° C. and a current density of 60 A/dm$^2$.

Successively, after subjecting the surface of the Zn plated film to chromate treatment, the first layer is extruded to constitute a layer thickness of 50 $\mu$m by using the extrusion die ($11_1$) of the extrusion coating device shown by FIG. 2 by using PA 12 as polyamide-based resin on the outer peripheral face of the steel pipe on which an epoxy-based resin has been coated, heated and dried as a primer.

Further, polypropylene having no mutual dissolving performance in respect with polyamide-based resin is extruded on the first layer comprising the polyamide-based resin layer to constitute a layer thickness of 1 mm by using the extrusion die ($11_2$) as shown by FIG. 2 by which the second layer is multiplexed with and coated on the first layer.

The obtained multiple coat metal pipe is cut into portions each having a length of 300 mm, the peel off test as shown by FIG. 1 is carried out in respect of 6 pieces of samples among them by which it is found that the second layer is peeled off at a time point when parallel slits are cut therein and the first layer does not adhere to the second layer at all.

Further, the obtained multiple coat metal pipe is cut into portions each having a length of 200 mm, in respect of 6 pieces of samples among them, peeling off is carried out by a length of 100 mm or more, the peeled-off portions are cut into portions each having a length of 100 mm, both end portions thereof are masked, the peeled-off portions are dipped into a measuring cylinder of 100 milliliter in which hydrochloric acid (1:1) is put by 100 milliliter and a depth of solution is 100 mm or more, and taken out after a stationary state for 10 minutes and an amount of dissolving of Zn is analyzed by an atomic absorption photometer. A result of the hydrochloric acid dipping test is shown by Table 1.

Example 2

After forming a Zn plated film similar to that in Example 1 on the outer peripheral face of a double-wound steel pipe formed similar to Example 1, chromate treatment is carried out on the surface, silane coupling agent is coated successively, PA 11 is used as polyamide-based resin on the outer peripheral face of the heated and dried steel pipe and the first layer is extruded to constitute a layer thickness of 30 m by a procedure similar to that in Example 1.

Further, the second layer is multiplexed with and coated on the first layer by extruding polyethylene having no mutual dissolving performance in respect with polyamide-based resin on the first layer of polyamide-based resin to constitute a layer thickness of 1.5 mm by a procedure similar to that in Example 1.

Similar to Example 1, the obtained multiple coat metal pipe is cut in portions each of 300 mm and with respect of 6 pieces of samples among them, the peel off test similar to that in Example 1 is carried out and as a result, in respect of each of the 6 pieces of samples, the second layer is peeled off at a time point when parallel slits are cut in the second layer and no adhesion is caused between the first layer and the second layer.

Further, similar to Example 1, with respect to 6 samples among samples cut into 200 mm, the hydrochloric acid-dipping test similar to that in Example 1 is carried out and a result of analysis is shown by Table 1.

Example 3

A Zn plated film is formed similar to Example 1 on the outer peripheral face of a double-wound steel pipe formed similar to Example 1.

Further, after carrying out chromate treatment on the surface of the Zn plated film a first layer is extruded on the outer peripheral face of the steel pipe which has been coated with a titanium coupling agent, heated and dried to constitute a layer thickness of 40 $\mu$m by using PA 12 having the melting point of 205° C. as polyamide-based resin.

Further, a second layer is multiplexed with and coated on the first layer by extrusion to constituted a layer thickness of 500 μm by using PA 12 having the melting point of 165° C. as polyamide-based resin having mutual dissolving performance in respect with the first layer by a procedure similar to that in Example 1. Incidentally, temperature in extruding the second layer is 175° C. in the multiplexing and coating operation.

The obtained multiple coat metal pipe is cut into pieces each of 300 mm similar to Example 1, the peel off test similar to that in Example 1 is carried in respect of 6 pieces of samples among them, by which it is found that the peel off.strength is 75 g/cm at maximum and in each of 6 pieces of the samples, the first layer does not adhere to the second layer at all even when the second layer is peeled off.

Further, the hydrochloric acid-dipping test is carried out similar to Example 1 in respect of 6 pieces of samples among samples each cut to 200 mm similar to Example 1 and the result of analysis is shown in Table 1.

Example 4

A Zn plated film is formed similar to Example 1 on the outer peripheral face of a double-wound steel pipe formed similar to Example 1. Next, chromate treatment is carried out on the surface of the Zn plated film and thereafter, a coating is carried out on the outer peripheral face of the steel pipe which has been coated with an epoxy-based resin as a primer, heated and dried by dipping the steel pipe in a coating in which a bisphenol type epoxy-based resin and pigment are prepared by a solvent, and the pipe is heated for 60 seconds by which an epoxy-based resin layer having a film thickness of about 5 μm is formed.

Successively, a first layer is extruded on the outer peripheral face of the steel pipe formed with an epoxy-based resin similar to Example 1 except that a layer thickness of 50 μm is constituted by using a polyvinylidene fluoride resin.

Further, a second layer is multiplexed with and coated on the first layer by extrusion to constitute a layer thickness of 1.0 mm by using polypropylene as a polyolefin resin by a procedure similar to that in Example 1.

The obtained multiple coat metal pipe is cut in pieces each of 300 mm similar to Example 1 and the peel off test similar to that in Example 1 is carried out in respect of 6 pieces of samples among them by which it is found that with respect to each of 6 pieces of the samples, the second layer is immediately peeled off at a time point when parallel slits are cut therein and the first layer does not adhere to the second layer at all.

Further, the hydrochloric acid dipping test is carried out similar to Example 1 with respect to 6 pieces of samples among samples cut in pieces each of 200 mm similar to Example 1 and the result of analysis is shown by Table 1.

COMPARATIVE EXAMPLE 1

A double-wound steel pipe is prepared and a Zn plated film is formed on its outer peripheral face similar to Example 1, successively, a coating is carried out on the outer peripheral face of the steel pipe in which chromate treatment has been carried out on the surface of the Zn plated film by dipping the steel pipe in a coating in which bisphenol type epoxy-based resin and pigment are prepared by a solvent and the pipe is heated for 60 seconds at 300° C. by which an epoxy-based resin layer having a film thickness of about 15 μm is formed.

Successively, polyvinyl fluoride is coated on the steel pipe by dipping the steel pipe in a solution in which polyvinyl fluoride is dispersed in diethyl phthalate, the pipe is dried by heating the pipe for 60 seconds at 350° C. by which a first layer is constituted by forming a polyvinyl fluoride layer having a film thickness of about 15 μm.

Further, a thermally contractive tube comprising polyolefin resin and having a polyamide-based adhesive layer at an inner layer thereof is heated for 5 minutes at 160° C. thereby forming a second layer with a layer thickness of 1.0 mm.

The obtained multiple coat metal pipe is cut in pieces each of 300 mm similar to Example 1 and the peel off test similar to that in Example 1 is carried out in respect of 6 pieces of samples among them by which it is found that the peel off strength is 3200 g/cm.

Further, the hydrochloric acid-dipping test is carried out similar to Example 1 with respect to 6 pieces of samples among samples each cut to 200 mm similar to Example 1 and the result of analysis is shown by Table 1.

COMPARATIVE EXAMPLE 2

A double-wound steel pipe is prepared similar to Example 1, a Zn plated film is formed on the outer peripheral face similar to Example 1, chromate treatment is carried out on the surface of the Zn plated film, thereafter, multiple coating is.carried out by extruding a first layer of a layer thickness of 50 μm comprising PA 12 having the melting point of 165° C. on the outer peripheral face of the steel pipe in which an epoxy-based resin primer is coated, heated and dried and extruding a second layer comprising PA 12 having the melting point of 205° C. in a layer thickness of 800 μm at an extrusion temperature of 250° C.

The obtained multiple coat metal pipe is cut in pieces each of 300 mm similar to Example 1 and the peel off test similar to Example 1 is carried out with respect to 6 pieces of samples among them by which it is found that the peel off strength is 1240 g/cm at maximum and in each of 6 pieces of samples, the first layer adheres to the second layer when the second layer is peeled off.

TABLE 1

|  | Mutual dissolving performance | Amount of dissolving Zn |
| --- | --- | --- |
| Example 1 | none | 0 |
| Example 2 | none | 0 |
| Example 3 | present | 0 |
| Example 4 | none | 0 |
| Comparative Example 1 | none | 7.32 |
| Comparative Example 2 | present | Over 2000 |

(n = 6, unit: ppm)

Incidentally, in Table 1 described above, a value which is lower than a quantitative determination limit is set to 0.

According to a result of the peel off test and the hydrochloric acid dipping test in Table 1, it is found that in respect of the Examples according to the present invention, corrosion resistance is achieved, the peel off operation in end working of flaring, spooling, buldging or the like is facilitated since the peel off strength is weak and the corrosion resistance at the end working portion is not deteriorated. Meanwhile, in Comparative Example 1, although the corrosion resistance is achieved to some degree, the peel off operation is difficult and the corrosion resistance of the peeled-off portion is deteriorated and according to Comparative Example 2, the corrosion resistance is deteriorated, the peel off operation is difficult and the corrosion resistance of the end working portion is deteriorated.

Further, in respect of remaining 6 pieces provided by cutting each of the multiple coat metal pipes obtained by Examples 1 through 4 and Comparative Examples 1 and 2 to 300 mm, soft chipping and hard chipping tests are carried out under the above-described conditions, the both end portions are masked, the samples are dipped into a measuring cylinder of 100 milliliter constituting a depth of solution to 16 cm by putting hydrochloric acid (1:1) by 100 milliliter, the samples are taken out after a stationary state of 10 minutes and an amount of dissolving of Zn is measured by an atomic absorption photometer by which it is found that the amount of dissolving of Zn in respect of each of the samples of Examples 1 through 4 and Comparative Examples 1 and 2 is less than a quantitative determination limit and the soft chipping resistance and the hard chipping resistance are achieved in the Examples according to the present invention as well as the Comparative Examples.

As described above, according to the present invention, a multiple coat metal pipe and its fabrication method having excellent corrosion resistance without deteriorating chipping resistance or splashing resistance, capable of being fabricated easily, capable of simply carrying out peel off operation owing to a weak peel off strength where corrosion resistance of an end working portion is not deteriorated can be provided.

What is claimed is:

1. A multiple coat metal pipe which is a metal pipe constituted by multiplexing and coating a first layer comprising a resin having an adhesive force in respect of a surface treatment layer formed on an outer peripheral face of the metal pipe and capable of being extruded and a second layer provided on an outer peripheral face of the first layer, having a chipping resistance and capable of being extruded, wherein both the first layer and the second layer are substantially in a non-adhesive state such that a peel off strength between the first layer and the second layer is 75 g/cm or less whereby the peel off strength enables the second layer to be peeled off from the first layer without peeling off the first layer;

wherein the metal pipe is provided with an end subjected to an end working.

2. The multiple coat metal pipe according to claim 1, wherein the end working is a flaring, a spooling or a bulging.

3. The multiple coat metal pipe according to claim 1, wherein a total thickness of the first layer and the second layer is 120 $\mu$m to 1.55 mm.

* * * * *